United States Patent [19]

Laudenslager et al.

[11] Patent Number: 5,412,682
[45] Date of Patent: May 2, 1995

[54] HALOGEN COMPATIBLE LASER HEAD

[75] Inventors: James B. Laudenslager, Long Beach; Fred G. Kinley, Mission Viejo; Shing-Wu P. Tzeng, Fountain Valley, all of Calif.

[73] Assignee: Advanced Interventional Systems, Inc., Irvine, Calif.

[21] Appl. No.: 220,969

[22] Filed: Mar. 31, 1994

[51] Int. Cl.$^6$ .............................................. H01S 3/03
[52] U.S. Cl. ...................................... 372/65; 372/83; 372/61
[58] Field of Search ...................... 372/65, 82, 87, 83, 372/61, 57

[56] References Cited

U.S. PATENT DOCUMENTS

| | | |
|---|---|---|
| 4,549,091 | 10/1985 | Fahlen et al. |
| 4,611,327 | 9/1986 | Clark et al. |
| 4,641,314 | 2/1987 | Koseki ................................. 372/65 |
| 4,646,336 | 2/1987 | Koseki ................................. 372/65 |
| 4,891,818 | 1/1990 | Levatter ............................... 372/61 |
| 4,979,181 | 12/1990 | Nakanose et al. ..................... 372/65 |
| 5,188,632 | 2/1993 | Goldenberg . |

OTHER PUBLICATIONS

XMR, Inc. article on *150 Watt XeCl Excimer Laser*, Model XC-150, "Excimer Lasers Adapt to Angioplasty" by James Laudenslager, publisher May, 1988.

*Primary Examiner*—Lëon Scott, Jr.
*Attorney, Agent, or Firm*—Richard L. Myers

[57] ABSTRACT

A laser head comprising a tube having a wall with the configuration of a hollow cylinder. A first ring flange extends radially generally outwardly of the tube wall at one end and is connected to the tube by a single continuous weld. A second plate flange is disposed at the same end and extends generally axially of the first flange. The first flange is coupled to the second flange and sandwiches a metal gasket therebetween to form a pressure seal. An electrode assembly is mounted to the second plate flange and at least one high voltage discharge feed extends through the wall of the tube to energize the electrode assembly. The tube is formed of a homogeneous metal that is free of any surface plating and is less reactive with Halogen gas than pure aluminum. In an associated method, the interior surface of the tube is polished to reduce the surface area and inhibit the entrapment of water vapor.

34 Claims, 5 Drawing Sheets

HALOGEN COMPATIBLE LASER HEAD

BACKGROUND OF THE INVENTION

1. Field of the Invention

This invention relates generally to above atmospheric pressure gas discharge lasers, and more specifically to pulsed transverse electric discharge excimer or rare gas halide lasers.

2. Discussion of the Prior Art

A rare gas halide laser includes a multi-atmospheric pressure mixture predominantly consisting of a rare gas buffer such as helium, neon or argon (more than 80%), a reactive rare gas such as Krypton or Xenon (usually less than several percent), and a trace amount of halogen gas such as HCl or $F_2$ (usually less than 1%). The halogen component of rare gas halide lasers is very reactive. To the extent that this component reacts with impurities and other materials in the laser housing, the gas mixture degrades resulting in a substantial reduction in the pulse laser energy produced by gas discharge. If the chamber cannot be thoroughly cleaned of impurities, this degradation greatly reduces the life of the gas mixture so that an entire gas exchange must be conducted. With excimer lasers of the past, this gas exchange has typically been required on a weekly or monthly basis depending on usage and the materials of construction. So frequent has been this requirement for gas exchange that customers have been required to purchase elaborate equipment and to train their own personnel in the exchange process.

The laser chamber is formed by a vacuum/high pressure containment vessel or housing for the gas mixture, with windows at each end of the vessel to allow for optical feedback and coupling of laser light. Inside the laser housing two transverse longitudinal discharge electrodes extend along the length of the chamber. These electrodes produce a pulsed electric discharge transverse to the electrodes which excites the gas mixture and produces the excited rare gas halide molecule which supports stimulated laser emission. In order to produce a uniform efficient discharge at pulse repetition frequencies, the laser gas is circulated across the discharge region by a fan assembly. The initial main discharge pulse is facilitated by a preionization assembly which produces a uniform density of electrons within the discharge region. Both the main discharge and the preionization apparatus require electrical connections having a low inductance in order to produce uniform stable discharge excitations. A heat exchanger may also be provided in the laser chamber to remove excess heat resulting from higher duty cycles.

It has been appreciated that the laser head must be formed from a material which is compatible (non-reactive) with the halogen in the gas mixture. Nickel has been a preferred material although it is generally felt to be too expensive to form the entire structure of this material. As a result, a base material such as aluminum has been plated with nickel in order to present a nonreactive surface to the gas mixture. Unfortunately, even with tight control of the process, the plating has tended to blister and otherwise degrade, in which case the underlying aluminum has undesirably reacted with the halogen gas.

In order to meet both vacuum and high pressure criteria, the containment vessel has been formed as a cylinder with the discharge electrodes extending longitudinally between the ends of the cylinder. The cylinder has been sealed at its opposing ends by a pair of end plates. In prior tubular laser designs where it has been necessary to introduce high voltage along the length of the electrodes, large lateral sections of the cylinder have been removed and replaced with flat plates to support the associated electrical components. This configuration has significantly degraded the structural integrity of the cylindrical vessel, often below ASME standards for a pressure vessel. The welding required for this design has required a pressure code certified welder who may be knowledgeable about pressure safety but is not necessarily aware of clean, high vacuum considerations.

In order to maintain the structure of the cylinder, prior lasers have supported the interior laser components, such as the electrodes, on one of the end plates. These designs have relied on a single electrical discharge connector, passing through the same end plate to energize the electrodes. Since electric discharge specifications require balanced inductance over the entire length of the transverse discharge electrode, this design has required that capacitors be mounted within the laser to balance the discharge and lower the discharge inductance. These capacitors tend to degrade when directly exposed to the halogen gas, and unfortunately servicing requires disassembly of the entire laser head. Although attempts have been made to coat the capacitors with halogen compatible materials, such efforts have fallen short in the absence of suitable coatings.

The mounting of components on an end plate has also been attempted by providing a sealed tube within the cylindrical vessel. This interior tube has been isolated from the gas mixture so that the electrical components within the tube do not react to reduce gas lifetime. This design has added extra expense and size to the laser head, and has been very difficult to service since the laser chamber must be opened to access the electrical components. Not only is this servicing procedure labor intensive, but care must be taken not to allow the interior parts to be exposed to air. Such exposure could cause material corrosion and require extensive laser chamber cleaning and reconditioning after reassembly.

In the past, metal seals have been avoided at the end flanges because they tend to chip the nickel plating. In most cases O-ring seals have been used, but these tend to outgas halocarbons which opacify the windows and also reduce gas lifetimes. In 1986, one of the present inventors unsuccessfully used high vacuum knife edge flanges for a research medical laser. In this design, the standard ASME pressure welding techniques required both inside and outside continuous partial penetration welds for the cylinder and flange. This led to contamination from a leak in the inside weld and which was impossible to locate using a leak checker.

Bearings associated with the fan assembly have also been critical components. Generally non-lubricated bearings are preferred but these also must be formed from materials which are halogen compatible. Ceramic bearings have been used but with unsatisfactory results, leading to premature seizure.

A commercial bearing from Barden Corp. using a non-metallic bearing race of BarTemp material serves as a reliable dry bearing for halogen compatibility. Also in prior designs ground return plates have been provided in the discharge region associated with the electrodes of the laser. These plates have been allowed to contact the laser vessel over wide areas of the container. As a consequence, the vessel has tended to radiate electromagnetic interference which in turn has upset digital control electronics in proximity to the laser.

Notwithstanding the appreciation of the prior art that a laser head must be formed out of compatible materials, and must meet both high vacuum and pressure vessel requirements in a commercial environment, improvements have been necessary to achieve a structure which will meet the requirements of electrical design manufacturability, serviceability, reliability and safety for medical applications.

SUMMARY OF THE INVENTION

The laser head of the present invention includes a vessel which is provided in a cylindrical shape that is substantially maintained in order to meet both vacuum and pressure requirements. By maintaining the cylindrical integrity of the vessel, the walls of the cylinder can be reduced in thickness without sacrificing the safety of the vessel.

The vessel is formed of stainless steel which might be incompatible with the halogen gas were it not for the polishing of the interior surfaces of the container by an electropolishing process. This process not only smooths the inner surface thereby minimizing entrapment of moisture, but also tends to leave the surface with a high chromium content so that the vessel is substantially nonreactive with the dry halogen gas.

In the absence of plating, knife edge flanges can be incorporated at the ends of the cylinder without the risk of chipping or other plating degradation. A single interior weld can be used to attach a ring flange to the cylinder. This single weld does not entrap contaminants and provides for easy detection of any leaks. The knife edge flanges are also formed from electropolished stainless steel and are readily available as off-the-shelf high vacuum tubing components. The knife edge flanges are of further advantage because they function with metal gaskets which do not outgas.

The electrode assembly can be mounted to extend between the end flanges on the cylinder. Inductance of this assembly can be greatly reduced by introducing the high voltage discharge feeds through the side of the vessel. This lateral introduction can also be accommodated using smaller openings with tubes having knife edge flanges which do not significantly degrade the structural characteristics of the cylindrical vessel.

Manufacture of the laser head is greatly facilitated by designing the end flanges with rotatable members which facilitate alignment of the longitudinal electrodes with the lateral high voltage feeds. A high tolerance for this alignment is not required if the high voltage feeds are flexibly coupled, for example with an electrically conductive bellows, to the interior electrode. The bellows is positioned so that both the inside and the outside of the bellows is exposed to the laser gas. As a result there are no pressure differentials which might tend to exercise the bellows into failure.

The ground return plates associated with the discharge electrode assembly are coupled to the cylindrical vessel only in the vicinity of the high voltage lateral feeds. As a result, the discharge current loop does not flow through a large surface of the laser vessel. The reduced EMI radiation makes this laser head significantly more compatible with digital control electronics associated with the laser and other equipment located within the medical environment.

As a result of the combined effects of all these improvements, the degradation of the laser gas can be significantly reduced. Importantly, the requirement for a gas exchange has been extended from about one week to several months. This exchange can now be achieved with a service call from the manufacturer so that elaborate exchange equipment and highly trained personnel are not required by the user.

These and other features and advantages of the invention will be more apparent with a description of preferred embodiments and reference to the associated drawings.

DESCRIPTION OF PREFERRED EMBODIMENTS

Figure 1:
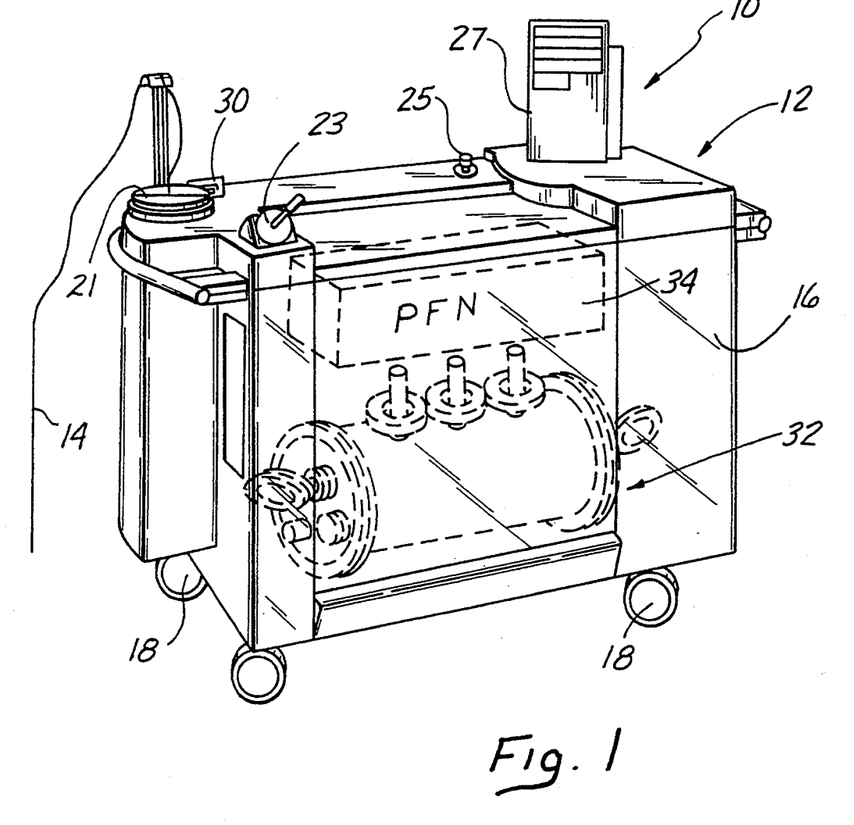
FIG. 1 is a perspective view of a medical laser including a laser head of the present invention.

A medical laser is illustrated in FIG. 1 and designated generally by the reference numeral 10. This laser 10 includes a console 12 which generates laser energy with characteristics preferred for medical applications, and a catheter 14 which delivers that energy to a patient. In a preferred application of the laser 10, the catheter is introduced into the coronary arteries of the patient where the laser energy is used to ablate occlusive plaque. The characteristics desired for the laser energy as well as the process for administering that energy through the catheter 12, can be better understood with reference to applicant's copending application Ser. No. 07/909,054 filed on Jul. 2, 1992 and entitled "Apparatus and Method for Optically Controlling the Output Energy of a Pulsed Laser Source. Preferred methods and apparatus associated with the catheter 14 can be found in U.S. Pat. No. 5,188,632 issued Feb. 23, 1993 and entitled "Guidance and Delivery System for High Energy Pulsed Laser Light."

The console 12 includes the cabinet 16 which is portably movable on casters 18. Mounted on the cabinet 16 is a catheter pedestal 21, a fluence detector 23, an emergency switch 25, and a display and control panel 27. Operation of the laser 10 can be greatly facilitated by provision of a card reader 30 of the type disclosed and claimed in applicant's copending application Ser. No. 08/063,898 filed on May 18, 1993 and entitled "Optical Catheter Specification Data System and Method of Using Same."

Of particular interest to the present invention is a laser head designated generally by the reference numeral 32, and a pulse forming network 34 which supplies the electrical energy necessary to energize the laser head 32. This pulse forming network 34 is disclosed and claimed in applicant's copending application filed on even date herewith. In operation, the laser head 32 produces laser energy which is introduced through the pedestal 21 to the catheter 14. Placing the end of the catheter 14 into the fluence detector 23 enables one to measure the exact magnitude of the laser energy at the point of delivery.

Figure 2:
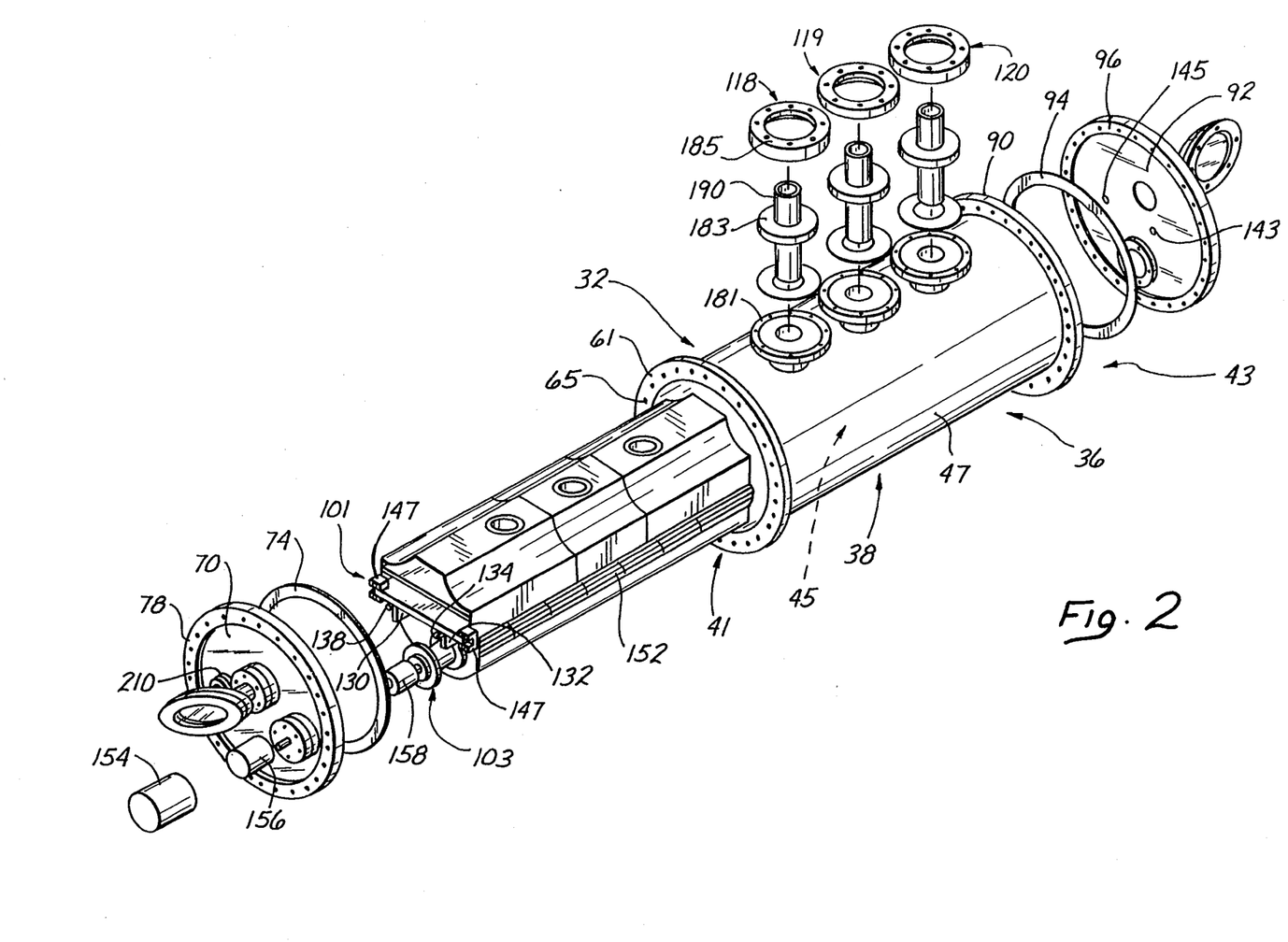
FIG. 2 is an axially exploded view of the laser head illustrated in FIG. 1.
Figure 3:
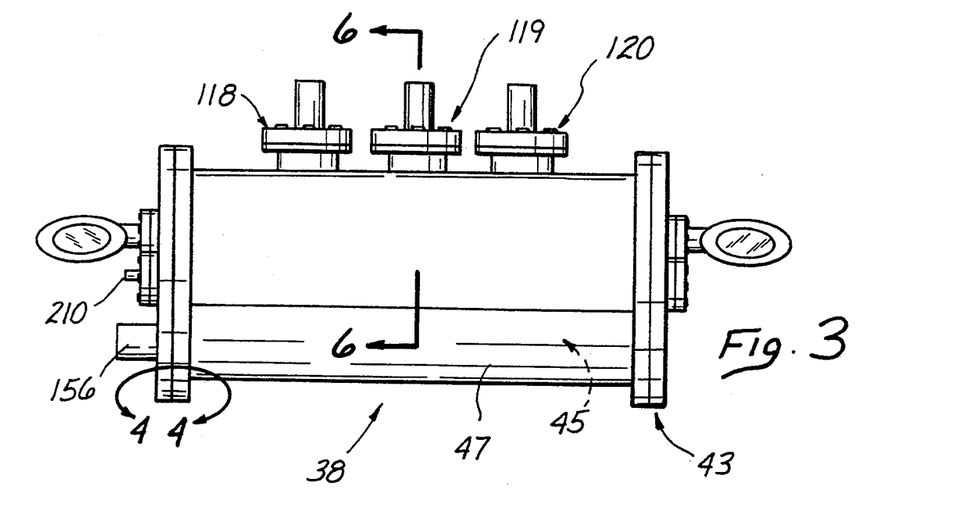
FIG. 3 is a side elevation view of the laser head illustrated in FIG. 1.

A preferred embodiment of the laser head 32 is best illustrated in the exploded view of FIG. 2 and the side elevation view of FIG. 3. This embodiment of the laser head 32 includes a housing or vessel 36 formed from a tube 38 and end sections 41 and 43 which define a laser chamber 45. The tube 38 of the vessel 36 is formed with a wall 47 having an inner surface 50 and the shape of a hollow cylinder. This shape is preferred in order to meet ASME standards for pressure containment vessels. The cylindrical shape is known to provide a high degree of structural integrity which is of particular interest to this invention. By maintaining the cylindrical shape as much as possible, the wall 47 of the tube 38 can be reduced in thickness. In a preferred embodiment, the wall 47 of the tube 38 is formed of stainless steel and has a thickness of about 0.125 inches.

This stainless steel material forming the vessel 36 is of particular interest to the present invention. Prior materials such as aluminum have relied upon plating of halogen compatible materials on the surfaces defining the chamber 45. In order to reduce the cost and the possibility of chipping which is commonly associated with plating, the end sections of the prior art have required elastomeric O-rings. Although these O-rings have reduced the possibility of chipping in the end sections, they have undesirably provided a high degree of outgassing which has degraded the halogen gas over a relatively short period of time. The stainless steel material forming the laser head 32 does not require plating. As a result, the end sections 41 and 43 can also be formed of stainless steel using off-the-shelf knife edge flanges and metal gaskets. A preferred embodiment of the end section 41 is illustrated in greater detail in FIG. 4. This end section 41 is formed by stainless steel vacuum flanges sometimes referred to as conflat flanges. This structure includes a ring flange 61 which is sealed to the wall 47 of the tube 38 at a weld 63. The ring flange 61 is chosen with an inner diameter which is substantially equivalent to that of the inner surface 50 of the wall 47. This enables the weld 63 to be formed as a single interior weld which is preferably a 100% weld extending through substantially the entire thickness of the wall 47. It will be noted that the weld 63 is an interior weld which is formed as a single bead. With these characteristics, the weld 63 does not entrap impurities which might ultimately degrade the halide gas in the chamber 45. The ring flange 61 is provided with a plurality of bolt holes 65, which are spaced around its circumference. The flange 61 also has an outer surface 66 and a knife edge 67 which protrudes from the surface 66 outwardly of the tube 38.

Figure 4:
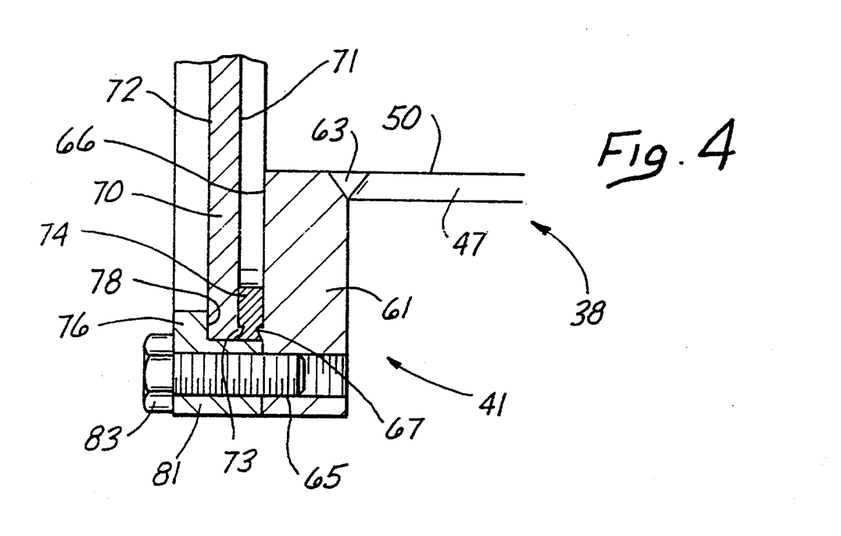
FIG. 4 is a cross section view of an end flange assembly taken along lines 3a—3a of FIG. 3.

The end section 41 also includes a plate flange 70 which has an inner surface 71 and an outer surface 72. The plate flange 70 is sized and configured to extend across the circular opening at the end of the tube 38. The flange 70 is also provided with a circular knife edge 73 which extends inwardly of the tube 38, so that the two knife edges 67 and 73 face each other. A circular metal gasket 74 is disposed between the knife edges 67 and 72 on the flanges 61 and 70 respectively.

A circular collar 76 has an inwardly facing shoulder 78 and a plurality of bolt holes 81 which extend around its circumference in individual alignment with the bolt hole 65 on the ring flange 61. A plurality of bolts 83 extend through the holes 81 to engage a threaded nut or threaded hole 65. As the bolts 83 are tightened, the collar 76 is drawn toward the ring 61. The collar 76 is sized so that the shoulder 78 engages the outer surface 72 with the plate flange 70 sandwiched between the collar 76 and the ring flange 61. With the gasket 74 disposed between the knife edges 67 and 73, operation of the bolts 83 causes the material of the gasket 74 to spread circumferentially outwardly and form a high pressure vacuum seal between the ring flange 61 and the plate flange 70.

A similar flange structure can be provided at the end section 43 which includes a ring flange 90, plate flange 92, metal gasket 94, and collar 96.

All of the flanges 61, 70, 90, 92, as well as the collars 76, 96 are preferably formed of stainless steel. These components are readily available so that the component costs associated with the end sections 41 and 43 are significantly reduced over similar structures of the prior art. Where metal gaskets, such as the gaskets 74, 94 have been intolerable in plated structures of the past, the low cost and high integrity provided by the metal gaskets 74, 94 and the associated knife edges are particularly appreciated in the present invention.

The plating associated with prior vessels has been necessary in order to present a compatible surface to the halogen gasses in the chamber 45. While solid nickel has been contemplated for the vessel structure, this material is generally thought to be too expensive to use in a solid form. Hence, nickel plating of less expensive materials, such as aluminum, has been preferred. In order to avoid the plating, the vessel needs to be formed of a homogeneous material which may consist of either a single solid material or an alloy. Furthermore, the materials used must present a surface which is halogen compatible. It has generally been felt that stainless steel does not meet this criteria primarily due to its iron content. However, in accordance with the present invention, it has been found that a homogeneous material such as stainless steel can be electropolished to change the nature of the interior surfaces defining the chamber 45.

The process of electropolishing accomplished two purposes. First, the surface being polished is highly smoothed. This insures that surface imperfections, which might otherwise entrap impurities and moisture, are substantially removed. This is greatly appreciated in any design intended to extend gas life. Second, the electropolishing process tends to remove atoms other than chromium so that the percentage of chromium content at the interior surface is significantly increased. Since chromium is relatively compatible with halogen gasses, this electropolishing process enables the vessel 36 to be formed of a homogeneous metal alloy which is relatively inexpensive and provides an interior surface which is halogen compatible. This can all be achieved without suffering the consequences of surface plating, thereby permitting the use of the metal gasket 74 and low cost flanges 61 and 70 previously discussed.

The orientation of components within the chamber 45 is also of interest to the present invention. These components include an electrode assembly 101 and a fan or blower assembly 103. Both of these assemblies 101, 103 extend longitudinally between the end sections 41 and 43. Importantly, these assemblies 101, 103 can be mounted to the plate flange 70 to facilitate alignment and assembly of the laser head 32.

Figure 5:
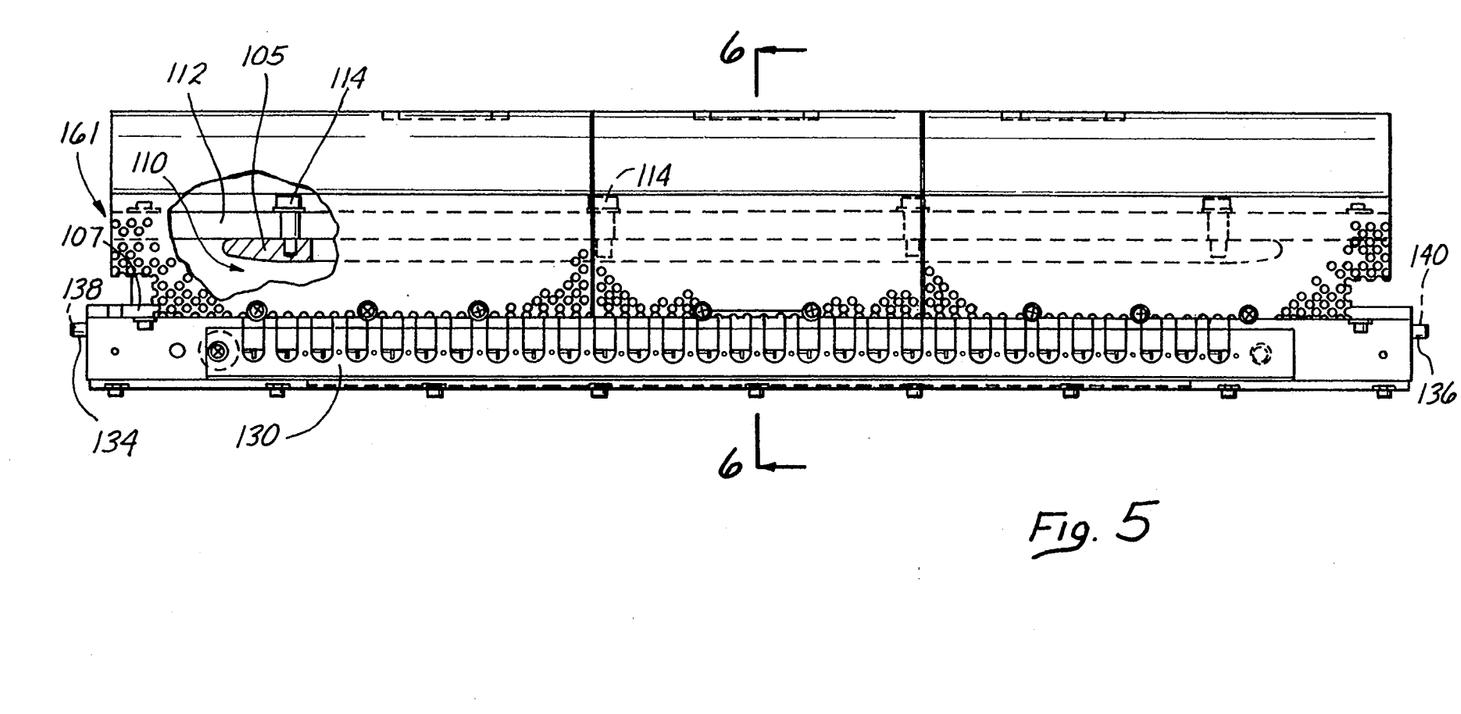
FIG. 5 is a side elevation view partially in phantom of the electrode assembly associated with the present invention.
Figure 6:
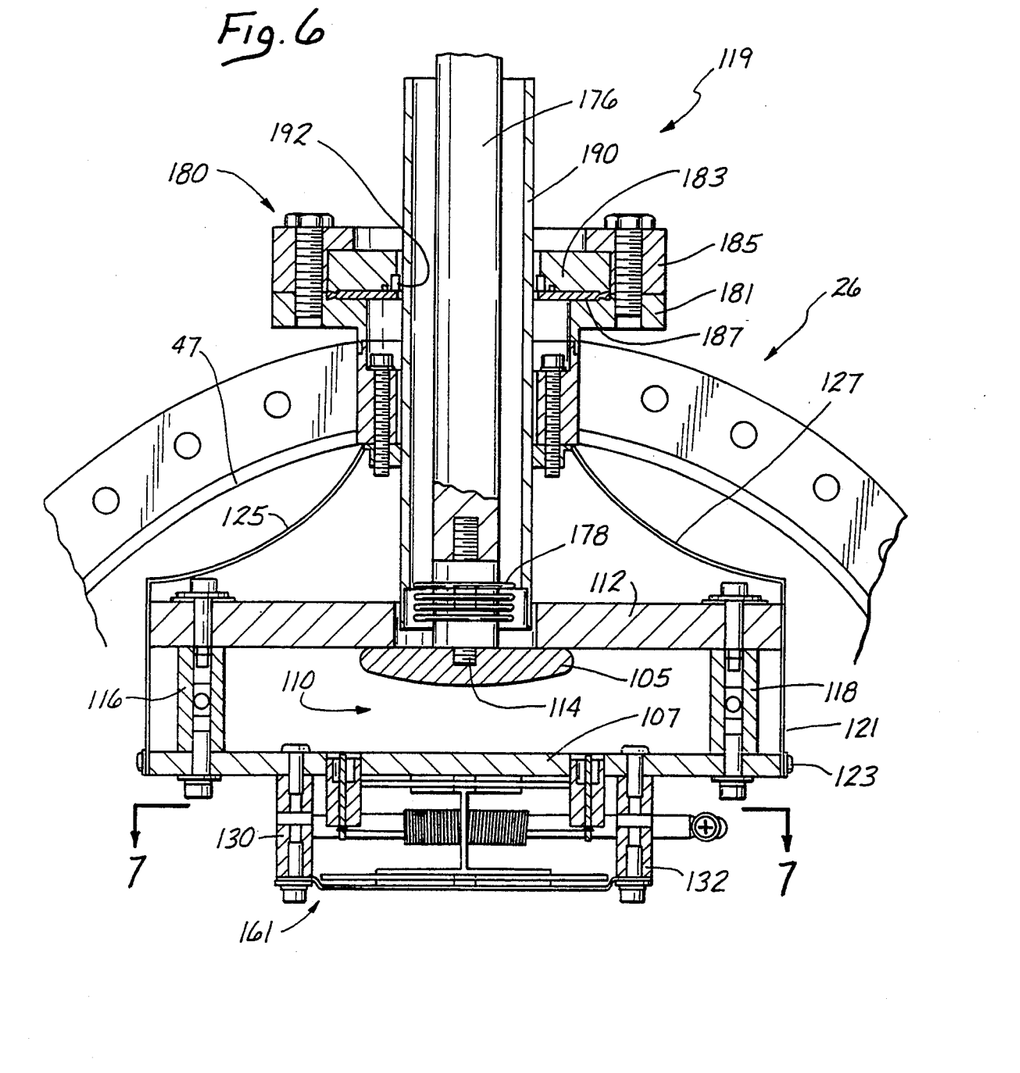
FIG. 6 is a cross section view of the electrode assembly taken along lines 6—6 of FIG. 3 and FIG. 5, and further illustrating a preferred orientation of the lateral high voltage feed relative to the electrode assembly.

The electrode assembly 101 is illustrated in greatest detail in FIGS. 5 and 6. This assembly 101 includes a first electrode 105, which functions as a cathode in a preferred embodiment, and a second electrode 107 which functions as an anode in the preferred embodiment. These electrodes 105, 107 are relatively narrow in cross section, as illustrated in FIG. 6, but have a substantial longitudinal dimension, as illustrated in FIG. 5. Thus they are disposed to extend longitudinally through the tube 38 where they define a discharge region 110 of the chamber 45.

The anode electrode 107 has a generally planar configuration and is formed from nickel plated aluminum. The cathode electrode 105 is formed of solid nickel and is rigidly held to a ceramic support 112 by a plurality of bolts 114, best illustrated in FIG. 5. The electrode 105 and electrode 107 are critically aligned in a fixed relationship by stainless steel spacers 116 and 118 which are bolted between the support 112 and the electrode 107.

The discharge region 110 is surrounded by a current return shroud 121 which is mounted to the electrode 107 by screws 123. This current return shroud 121 extends upwardly from the anode electrode 107 around the anode electrode 105 and associated support 112. The shroud 121 can also be formed from electropolished stainless steel. Above the support 112, the shroud 121 is provided with a pair of concave wings 125 and 127 which are attached to the wall 47 of the vessel 36 in a manner subsequently discussed. The concave shape of the wings 125, 127 facilitates alignment of the electrode assembly 101 within the chamber 45.

Attachment of the current return shroud 121 to the tube 38 along a relatively small area of the wall 47 is of particular advantage to the present invention. Where ground returns of the past have contacted the vessel wall over widely separated points, electromagnetic interference has radiated from a relatively large area of the vessel wall. By contacting the wall 47 over a smaller area, the tube 38 no longer functions as a large antenna, so that electromagnetic interference is greatly reduced. This advantage is particularly appreciated by those monitoring the digital electronics which may be associated with the console 12 or other electronic apparatus in the surgical environment.

The blower assembly 103 also has a longitudinal configuration so that it extends in a generally fixed relationship with the discharge region 110 between the end sections 141 and 143. The blower assembly 103 includes an elongate cross flow fan 152 which is driven by a magnetic motor 154. This motor includes an external magnet (not shown) and is mounted to the exterior of the plate flange 70 around a cylindrical enclosure 156. The fan assembly 103 also includes and interior magnet 158 which is coupled to the fan 152. The fan assembly 103 can be rigidly mounted to the electrode assembly 101 to form a single subassembly. This also facilitates manufacture of the laser head 32. With this subassembly mounted to the plate flange 70, the interior magnet 158 extends into the closure 156 and is rotated by a rotating magnetic field created by the motor 154 and associated external drive magnet (not shown). In this manner the blower assembly 103 can be operated without sacrificing the integrity of the chamber 45. The interior magnet 158 can be welded inside a stainless steel housing and the drive magnet can be similarly isolated by a stainless steel interface in the end flange.

The electrode assembly 101 and blower assembly 103 can be supported on a pair of rails 130, 132 which extend from the anode electrode 107 on the side opposite the cathode electrode 105. The rails 130, 132, extend longitudinally through the chamber 45 but include at each end an associated tab which extends axially of the electrode assembly 101. As best illustrated in FIG. 5, the rail 132 includes a tab 134 and a tab 136, while the rail 130 includes a tab 138 and a tab 140. These tabs are received in complimentary holes in the plate flanges 70 and 92. For example, the tabs 134 and 138 are received in holes (not shown) in the plate flange 70 while the tabs 136 and 140 are received in holes 143 and 145 respectively in the plate flange 92. Thus the tabs 134–148 support the electrode assembly 101 on the plate flanges 70 and 92 of the end sections 41, 43 respectively.

The electrode assembly 101 is more rigidly mounted to the plate flange 70 in the end section 41 by a pair of bolt flanges 147. For ease of assembly, similar bolt flanges are not provided at the end section 43. Rather, during the assembly process, the end section 41 of the electrode assembly 101 is rigidly mounted to the plate flange 70. Then the tube 38 is slipped or otherwise moved over the opposite end section 43 of the electrode assembly 101. Finally, the plate flange 92 with the holes 143, 145 is positioned to receive the tabs 136 and 140. While this construction provides a rigid support for the electrode assembly 101 at the end section 41, the tabs 136, 140 and associated holes 143, 145 provide support for the opposing end section 43. In a preferred embodiment the support provided by the tabs 136, 140 is not rigid by rather is limited at least to a single direction, namely the direction of gravitational pull. This insures that the electrode assembly 101 is not required to maintain a cantilevered orientation.

Figure 7:
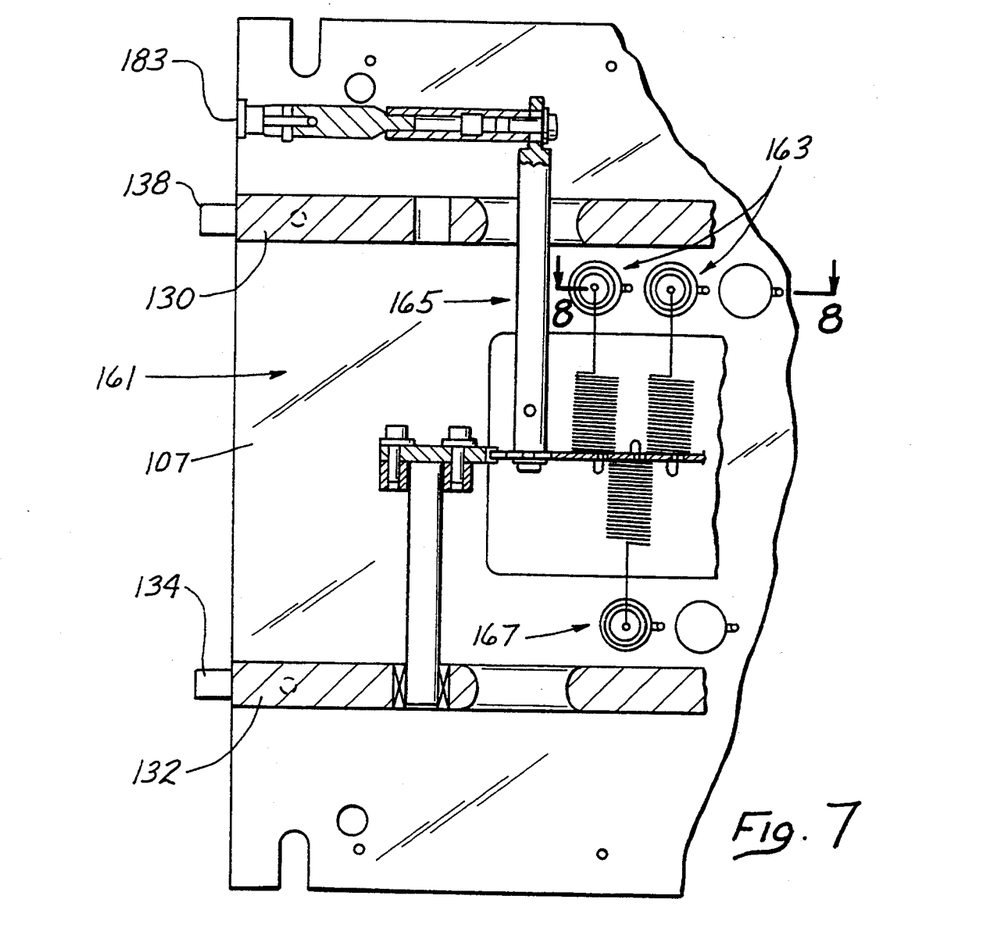
FIG. 7 is a top plan view partially in section of a preionizer assembly taken along the lines 7—7 of FIG. 5.

A preionizer assembly 161 is illustrated in FIGS. 5–7 and designated generally by the reference numeral 161. The preionizer 161, as illustrated in FIG. 7, includes a plurality of pin assemblies 163 each disposed in one of two rows 165 and 167 which extend parallel to each other and parallel to the electrodes 105, 107 along the length of the discharge region 110. A total of 58 pin assemblies 163 are shown in FIG. 7. A preferred embodiment of the preionizer assembly 161 is disclosed in greater detail in applicant's copending application filed on even date herewith and entitled Preionizer for Laser Assembly.

The high voltage feedthroughs 118 and 120 are similar to the feedthrough 119 which is best illustrated in the cross-sectional detail of FIG. 6. This feedthrough 119 includes an inner conductor 176 which directs the high voltage through a bellows conductor 178 to the cathode electrode 105. This inner conductor 176 extends generally radially of the vessel 26 and is held in fixed relationship with the wall 47 by a conflat flange assembly 180 similar to that disclosed with reference to FIG. 4. This structure includes a ring flange 181, a plate flange 183 and a collar 185. The collar 185 is bolted to the ring flange 181 and sandwiches the plate flange 183 therebetween. A knife edge gasket 187 is relied upon to form a circumferential seal between the flanges 181 and 183 in the manner previously discussed.

A cylindrical ceramic insulator 190 is disposed inwardly of the flange assembly 180 and in spaced relationship with the inner conductor 176. This ceramic insulator 190 is held in sealing engagement with the plate flange 183 by a ceramic to metal seal 192.

It is preferable if the electrode subassembly 101 can be formed as a unit and mounted into the laser vessel between the end flanges 70 and 92, without requiring excessively tight machining tolerances. This is achieved in a preferred embodiment which includes a compliant or flexible interconnect, such as the bellows conductor 178, between a feedthrough inner conductor 176 and the cathode electrode 105. This allows the main discharge feedthroughs 118–120 to be formed in a traditional ceramic to stainless steel, metal-brazed construction. It also permits use of the materials of choice as discussed herein, namely stainless steel, metal-oxide ceramics, and metal-oxide brazing alloys.

Although many feedthroughs in parallel could be used in order to minimize the laser head loop inductance, the preferred approach in designing a cost effective laser is to minimize the number of expensive components such as feedthroughs, and to keep the inductance down to a level manageable by the external driving circuit PFN 34. This reduces the overall inductance per feedthrough.

In a preferred embodiment, the laser head uses the three main discharge feedthroughs 118, 119, and 120 which are of a predominately radial design in the region of laser vessel penetration. The inductance in this region scales as the natural log of the ratio between the radii of the inner conductor 176 and the flange assembly which functions as an outer conductor 180. Disposed between the inner and outer conductors is the ceramic insulator 190 of the feedthrough which can be high temperature brazed to the inner conductor 176 and outer conductor 180, forming a traditional high vacuum seal, but one which is of fundamental importance in minimizing water permeation and halogen reaction in the presently discussed laser design.

In the region of the high voltage applied across these feed through 118–120, undesirable parasitic corona plasma generation is possible. To prevent the potential spread of corona plasma across insulator gaps from shorting out the main discharge loop, care can be taken to lower the electric field strengths below the onset of corona over as large a gap as possible, without compromising inductance. In general, lower inductance is accompanied by an increase in the potential for incipient corona plasma generation. In the present design, the inner conductor 116 of the main discharge feedthrough 119 is reduced in diameter inside the laser vessel and before the current return shroud take-off. This provides a rapid transition from a low inductance, coaxial relationship to a high inductance, low corona probability interconnect.

Although the invention has been disclosed with reference to specific embodiments, methods and materials, many modifications of these specific concepts will now be apparent to those skilled in the art. Accordingly, one is cautioned not to limit these concepts to the disclosed embodiments, but rather to determine the scope of the invention only with reference to the following claims.

We claim:

1. A laser head, comprising:
   a tube having a wall with a configuration of a hollow cylinder with two ends;
   a first flange disposed at one of the ends of the tube and extending generally radially outwardly of the tube wall;
   a single continuous weld connecting the first flange to the wall of the tube;
   a second flange disposed at the one end generally axially of the first flange;
   means for coupling the first flange to the second flange to close the one end of the tube; and
   a metal gasket disposed between the first flange and the second flange to form a pressure seal at the one end of the tube.

2. The laser head recited in claim 1 wherein the tube, the first flange and the second flange are formed of stainless steel.

3. The laser head recited in claim 2 wherein the stainless steel of the tube, the first flange and the second flange are electropolished to form a smooth surface.

4. The laser head recited in claim 1 further comprising:
   a first discharge electrode having and elongate configuration and extending between a first end and a second end;
   a second discharge electrode having an elongate configuration and extending between a first end and a second end, the second electrode having a fixed relationship with the first electrode; and
   means for coupling the first end of at least one of the first electrode and the second electrode to the second flange with the electrodes forming a discharge region extending through the tube.

5. The laser head recited in claim 4 further comprising:
   a third flange closing the other end of the tube; and
   means for supporting on the third flange the second end of at least one of the first element and the second element, the supporting means inhibiting movement of the electrodes in at least one lateral direction relative to the third flange.

6. The laser head recited in claim 4 further comprising:
   a preionizer including a plurality of spark pins extending in a longitudinal array; and
   means for mounting the preionizer with the spark pin array extending along the discharge region interiorly of the cylindrical tube.

7. The laser head recited in claim 6 wherein the spark pin array includes:
   a first plurality of the spark pins disposed in a first line extending along a first side of the elongate electrodes; and
   a second plurality of spark pins disposed in a second line extending along a second side of the elongate electrodes.

8. The laser head recited in claim 4 further comprising:
   at least one high voltage discharge feed extending through the wall of the tube; and
   means for mounting the discharge feed in electrically conductive relationship with one of the electrodes.

9. The laser head recited in claim 8 further comprising at least three high voltage electrode discharge feeds aligned in equally spaced relationship along the tube.

10. The laser head recited in claim 8 wherein the means for mounting the discharge feed includes a metal gasket.

11. The laser head recited in claim 10 wherein the metal gasket seals between knife edge flanges.

12. The laser head recited in claim 1 wherein the coupling means comprises a rotatable collar disposed axially outwardly of the second flange to sandwich the second flange between the first flange and the collar.

13. A laser head comprising:
a tube having two ends and a wall with the configuration of a hollow cylinder;
a first flange disposed at one of the ends of the tube and extending generally radially outwardly of the tube wall;
a second flange disposed at the one end generally axially outwardly of the first flange;
means for coupling the first flange to the second flange to close the one end of the tube;
a metal gasket disposed between the first flange and the second flange to form a pressure seal at the one end of the tube; and
the tube being formed of a homogeneous metal free of any surface plating, the metal being less reactive with Halogen gas than pure aluminum.

14. The laser head recited in claim 13 further comprising:
a single continuous weld disposed to couple the first flange to the tube and to form an ASME Pressure Code seal between the first flange and the tube.

15. The laser head recited in claim 13 wherein the metal comprises stainless steel.

16. The laser head recited in claim 15 wherein the tube and the flanges are electropolished to form a smooth surface.

17. The laser head recited in claim 13 further comprising:
a third flange closing the other end of the tube; and
means for supporting on the third flange the second end of at least one of the first element and the second element, the supporting means inhibiting movement of the electrodes in at least one lateral direction relative to the third flange.

18. The laser head recited in claim 17, further comprising:
a preionizer including a plurality of spark pins extending in a longitudinal array;
means for mounting the preionizer in a fixed relationship with the electrodes with the spark pin array extending interiorly of the cylindrical tube along the discharge electrodes; and
at least one high voltage preionizer feed extending through the second flange of the tube in electrically conductive relationship with the preionizer interiorly of the tube.

19. The laser head recited in claim 18 further comprising:
a blower assembly; and
means for mounting the blower assembly in a fixed relationship with the electrodes.

20. The laser head recited in claim 18 wherein the spark pins are formed of a Halogen compatible metal.

21. The laser head recited in claim 13 wherein the coupling means includes:
a collar disposed axially outwardly of the second flange in a fixed relationship with the first flange, the second flange being rotatably alignable between the first flange and the collar.

22. A method for making a laser, comprising the steps of:
providing a metal tube having a wall with a pair of ends and an interior surface defining a generally cylindrical chamber;
providing a first flange;
welding the first flange to the tube along a single continuous bead to form a seal between the first flange and the tube;
providing a second flange;
coupling the first flange to the second flange to close one of the ends of the tube; and
polishing at least the interior surface of the tube to reduce the surface area of the interior surface and to inhibit the entrapment of water vapor by the interior surface.

23. The method recited in claim 22 wherein the polishing step includes the step of electropolishing at least the interior surface of the tube.

24. The method recited in claim 23 further comprising the steps of:
providing a pair of discharge electrodes each having a first end and a second end; and
mounting the first ends of the discharge electrodes on the second flange with the electrodes disposed in a fixed relationship with each other and defining a discharge region of the laser head.

25. The method recited in claim 24 further comprising the steps of:
providing a third flange;
coupling the third flange to the other end of the tube; and
supporting the second ends of the electrodes against lateral movement in at least one direction relative to the third flange.

26. The method recited in claim 24 further comprising the steps of:
providing a preionizer including a plurality of pins disposed in a longitudinal array; and
mounting the preionizer with the pin array disposed within the tube in a fixed relationship with the electrodes.

27. The method recited in claim 26 further comprising the steps of:
providing at least one high voltage discharge feed; and
mounting the high voltage discharge feed to the wall of the tube with the feed extending into electrically conductive relationship with one of the electrodes.

28. The method recited in claim 27 further comprising the steps of:
flexibly connecting the high voltage feed to one of the electrodes to facilitate alignment of the tube and the electrodes.

29. A laser head, comprising:
a tube having an axis extending between two ends and a wall with the configuration of a hollow cylinder;
a first flange disposed at one of the ends of the tube and extending generally outwardly of the tube wall;
a second flange disposed at the one end generally axially outwardly of the first flange;
an electrode assembly including a pair of discharge electrodes disposed in a fixed relationship with each other;
means for mounting the electrode assembly to the second flange with the discharge region extending interiorly of the cylindrical tube; and
at least one high voltage discharge feed extending through the wall of the tube into electrically conductive relationship with the electrodes interiorly of the tube.

30. The laser head recited in claim 29 further comprising:

a supporting structure included in the assembly;

a first high voltage electrode mounted on the supporting structure of the assembly;

a second high voltage electrode mounted on the supporting structure of the assembly in fixed relationship with the first electrode; and a conductor included in the high voltage feed and disposed in electrically conductive relationship with the second high voltage electrode of the assembly.

31. The laser head recited in claim 30 wherein the conductor of the high voltage feed is rigidly mounted in fixed relationship with the tube, and the laser head further comprises:

a flexible conductor disposed to couple the second electrode to the rigid conductor of the high voltage feed, the flexible conductor facilitating alignment of the high voltage feed and the second electrode.

32. The laser head recited in claim 31 wherein the flexible conductor is in the form of a flexible bellows having a wall which defines interior regions of the bellows.

33. The laser head recited in claim 32 wherein the bellows is disposed within the tube and portions of the bellows wall define a hole for equalizing the pressures between the regions interior of the bellows and regions exterior of the bellows.

34. The laser head recited in claim 29 further comprising a metal gasket disposed between the first flange and the second flange to form a pressure seal at the end of the tube.

* * * * *